(12) United States Patent
Shiomi et al.

(10) Patent No.: US 12,087,180 B2
(45) Date of Patent: Sep. 10, 2024

(54) DISPLAY CONTROL DEVICE, DISPLAY SYSTEM, WELDING SYSTEM, WELDING METHOD, DISPLAY CONTROL METHOD, STORAGE MEDIUM

(71) Applicant: KABUSHIKI KAISHA TOSHIBA, Tokyo (JP)

(72) Inventors: Yasutomo Shiomi, Koza Kanagawa (JP); Tetsuo Sakai, Taito Tokyo (JP); Takayoshi Fujii, Yokohama Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 18/152,703

(22) Filed: Jan. 10, 2023

(65) Prior Publication Data

US 2023/0222930 A1    Jul. 13, 2023

(30) Foreign Application Priority Data

Jan. 11, 2022 (JP) .................... 2022-002330

(51) Int. Cl.
*G09B 19/24* (2006.01)
*G09B 5/02* (2006.01)
(Continued)

(52) U.S. Cl.
CPC .............. *G09B 5/02* (2013.01); *G09B 19/24* (2013.01); *G06V 10/774* (2022.01); *G06V 20/50* (2022.01)

(58) Field of Classification Search
CPC ........ B23K 9/09; B23K 9/095; B23K 9/0953; G09B 19/24
See application file for complete search history.

(56) References Cited

U.S. PATENT DOCUMENTS

2013/0040270 A1* 2/2013 Albrecht .............. B23K 9/0953
434/234
2014/0134579 A1* 5/2014 Becker .................... G09B 5/00
434/234
(Continued)

FOREIGN PATENT DOCUMENTS

JP  2009-160624 A  7/2009
JP  2019-155425 A  9/2019
(Continued)

OTHER PUBLICATIONS

"Daikin and Hitachi Embark on Collaborative Creation Aiming to Establish a Next-Generation Production Model Utilizing IoT to Support Skill Transfer from Expert Workers." Press release. Daikin Industries, Ltd. And Hitachi, Ltd. Dated Sep. 26, 2017.
(Continued)

*Primary Examiner* — Robert J Utama
(74) *Attorney, Agent, or Firm* — Knobbe, Martens, Olson & Bear, LLP

(57) ABSTRACT

According to one embodiment, a display control device extracts a first feature from a first image of a welding operation, and causes a display device to display the first feature and a guide, the guide being related to the welding operation. The guide preferably includes a second feature corresponding to the first feature. The first feature and the second feature each may indicate a shape and position of a component related to the welding operation.

18 Claims, 13 Drawing Sheets

(51) Int. Cl.
  *G06V 10/774* (2022.01)
  *G06V 20/50* (2022.01)

(56) References Cited

U.S. PATENT DOCUMENTS

| | | | |
|---|---|---|---|
| 2016/0267806 A1* | 9/2016 | Hsu | ........................ G09B 19/24 |
| 2018/0341248 A1* | 11/2018 | Mehr | .................. G05B 19/4099 |
| 2020/0193233 A1 | 6/2020 | Washitani et al. | |
| 2020/0357112 A1 | 11/2020 | Sakai et al. | |
| 2022/0108170 A1 | 4/2022 | Shiomi et al. | |
| 2022/0215519 A1 | 7/2022 | Shiomi et al. | |
| 2022/0379383 A1 | 12/2022 | Sakai et al. | |

FOREIGN PATENT DOCUMENTS

| | | |
|---|---|---|
| JP | 2020-006419 A | 1/2020 |
| JP | 2022-059843 A | 4/2020 |
| JP | 2020-095428 A | 6/2020 |
| JP | 2020-182966 A | 11/2020 |
| JP | 6818069 B2 | 1/2021 |
| JP | 2022-105404 A | 7/2022 |
| JP | 2022-182325 A | 12/2022 |

OTHER PUBLICATIONS

Jameela et al., "Simulation-Based Data Augmentation Using Physical Priors for Noise Filtering Deep Neural Network," ISPRS, dated Aug. 2020, pp. 247-254.
Yan et al., "A Data Augmentation Strategy Based on Simulated Samples for Ship Detection in RGB Remote Sensing Images," ISPRS, vol. 8, dated 2019 in 18 pages.

* cited by examiner

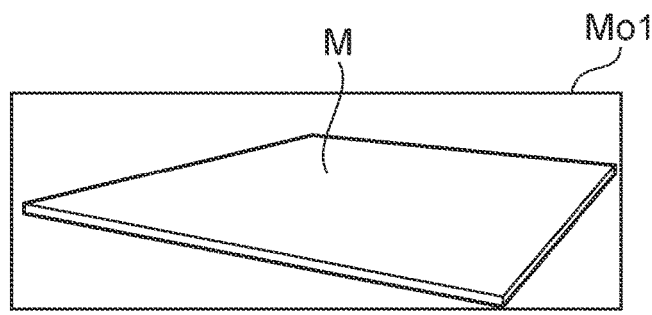
FIG. 8A
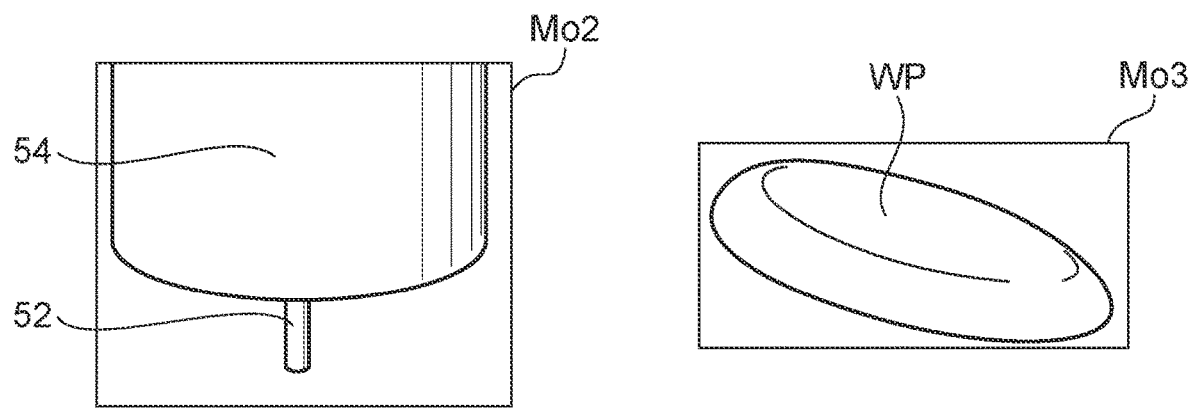
FIG. 8B
FIG. 8C
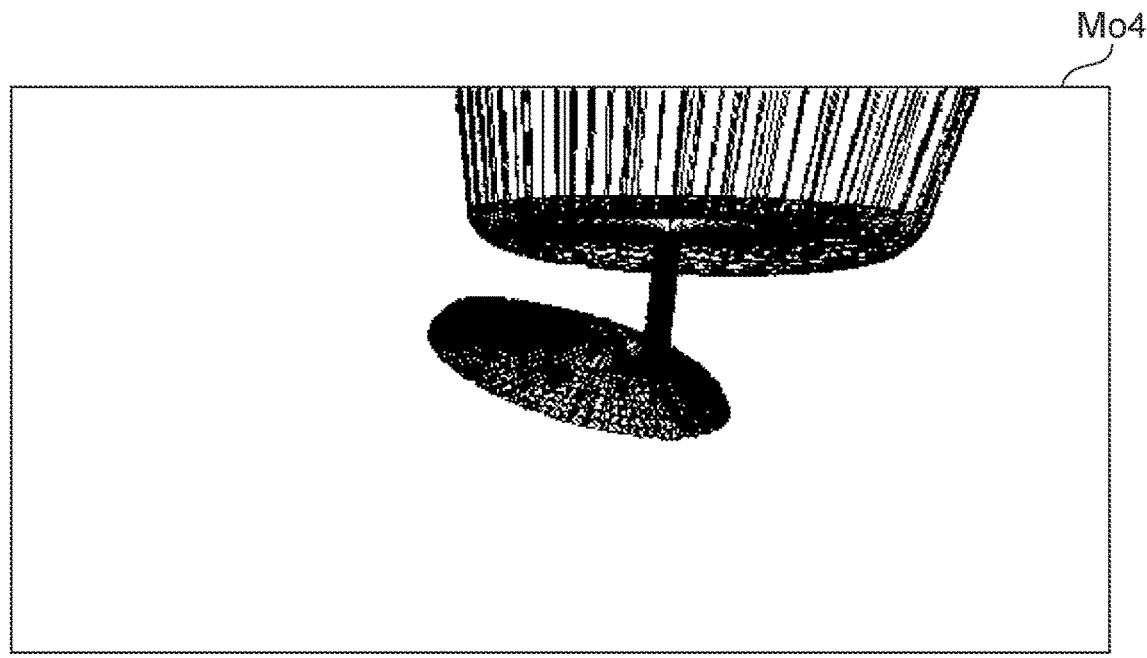
FIG. 8D

DISPLAY CONTROL DEVICE, DISPLAY SYSTEM, WELDING SYSTEM, WELDING METHOD, DISPLAY CONTROL METHOD, STORAGE MEDIUM

CROSS-REFERENCE TO RELATED APPLICATIONS

This application is based upon and claims the benefit of priority from Japanese Patent Application No. 2022-002330, filed on Jan. 11, 2022; the entire contents of which are incorporated herein by reference.

FIELD

Embodiments described herein relate generally to a display control device, a display system, a welding system, a welding method, a display control method, a storage medium.

BACKGROUND

Welding operations may be performed manually. The quality of manual tasks are dependent on the experience, knowledge, and the like of a worker. Technology that can improve the welding operation quality of a worker of limited experience or knowledge is desirable.

BRIEF DESCRIPTION OF THE DRAWINGS

FIGS. 8A to 8C are images of three-dimensional models of components related to the welding operation. FIG. 8D is an image of a three-dimensional model of the welding operation;

DETAILED DESCRIPTION

Figure 1:
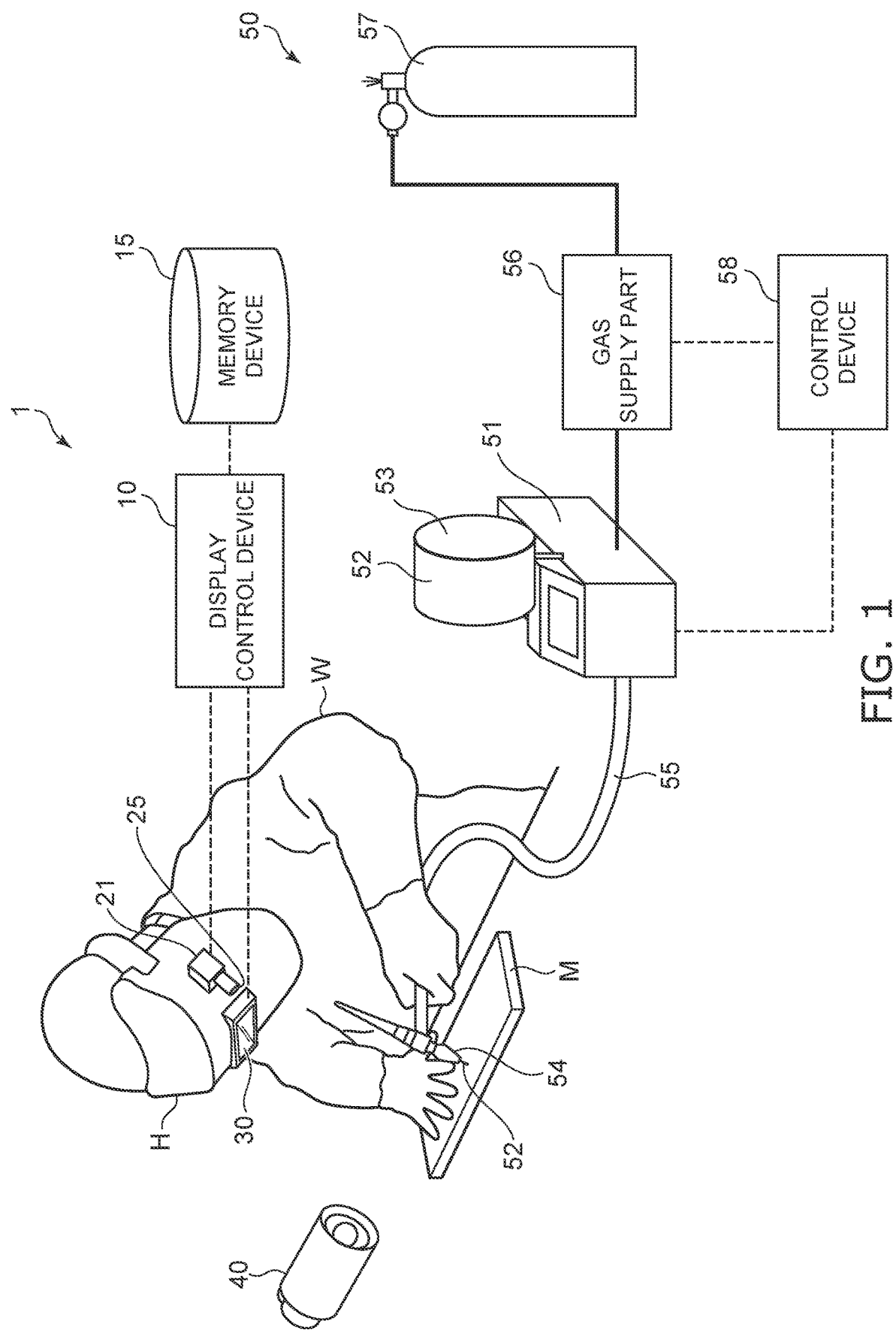
FIG. 1 is a schematic view showing the configuration of a display system according to an embodiment.

According to one embodiment, a display control device extracts a first feature from a first image of a welding operation, and causes a display device to display the first feature and a guide, the guide being related to the welding operation. The guide preferably includes a second feature corresponding to the first feature. The first feature and the second feature each may indicate a shape and position of a component related to the welding operation.

Various embodiments will be described hereinafter with reference to the accompanying drawings.

The drawings are schematic and conceptual; and the relationships between the thickness and width of portions, the proportions of sizes among portions, etc., are not necessarily the same as the actual values thereof. Further, the dimensions and proportions may be illustrated differently among drawings, even for identical portions.

In the specification and drawings, components similar to those described or illustrated in a drawing thereinabove are marked with like reference numerals, and a detailed description is omitted as appropriate.

FIG. 1 is a schematic view showing the configuration of a display system according to an embodiment.

As shown in FIG. 1, the display system 1 includes a display control device 10, a memory device 15, an imaging device 21 (a first imaging device), a display device 30, and lighting 40.

The imaging device 21 acquires an image by imaging the state of a worker W performing a welding operation. The imaging device 21 may acquire a video image and cut out a still image from the video image. The imaging device 21 is, for example, a camera that includes a CMOS image sensor or a CCD image sensor.

The display control device 10 acquires the image that is imaged. Also, the display control device 10 refers to a database that is stored in the memory device 15 and related to the welding operation. Based on the image and the data of the database, the display control device 10 outputs, to the display device 30, a guide related to the welding operation.

The display device 30 displays the guide based on an output signal from the display control device 10. In the illustrated example, the worker W wears a face piece H for welding. The imaging device 21 and the display device 30 are embedded in the face piece H.

The lighting 40 irradiates light toward a member M to be welded. The lighting 40 includes a light-emitting diode or a lamp. The lighting 40 may emit laser light. For example, the lighting 40 irradiates invisible light. The light that is irradiated from the lighting 40 may include a component (visible light) other than invisible light. It is favorable for the invisible light to be infrared light.

For example, the imaging device 21 receives light passing through an optical filter 25. The optical filter 25 may be located separately from the imaging device 21 or may be embedded in the imaging device 21. The optical filter 25 selectively transmits light of a specific wavelength. The imaging device 21 generates an image based on the light passing through the optical filter 25. By using the optical filter 25, white-out of the image due to the light emission of the arc can be suppressed. A band-pass filter can be used as the optical filter 25. Also, another optical filter 25 may be located in the optical path between the lighting 40 and the member M.

The wavelength band of the light irradiated from the lighting 40 is set according to the wavelength band of the light passing through the optical filter 25. For example, when the optical filter 25 selectively transmits infrared light, the lighting 40 irradiates light that includes infrared light. In such a case, to reduce the power consumption, it is favorable for the intensity of the infrared light component of the light irradiated from the lighting 40 to be greater than the intensity of the other components. The power consumption of the lighting 40 can be reduced by suppressing the intensity of the light components cut by the optical filter 25.

A welding device 50 is used in the welding operation. In the welding operation, a joined body is made by welding two or more members to form a continuous body. The welding operation that is performed using the welding device 50 is arc welding, laser welding, brazed joining (brazing), etc. The specific configuration of the welding device 50 is modifiable as appropriate according to the welding operation to be performed.

Here, an example in which arc welding is performed using the welding device 50 will be described. Specifically, arc welding is tungsten inert gas (TIG) welding, metal inert gas (MIG) welding, metal active gas (MAG) welding, carbon dioxide gas arc welding, etc. MAG welding or MIG welding is performed by the illustrated device.

The welding device 50 includes a wire supply part 51, a wire 52, a wire coil 53, a torch 54, a tube 55, a gas supply part 56, a gas source 57, and a control device 58.

The wire supply part 51 includes a wire coil 53 on which the wire 52 (a consumable electrode) is wound. The wire supply part 51 supplies the wire 52 of the wire coil 53 to the torch 54 via the tube 55.

The gas supply part 56 is connected with the gas source 57 and supplies a shielding gas stored in the gas source 57 to the torch 54. In the illustrated example, the shielding gas is supplied to the torch 54 via the wire supply part 51 and the tube 55. An inert gas (e.g., argon) can be used as the shielding gas. When MAG welding is performed, the shielding gas may include an active gas such as carbon dioxide gas or the like in addition to the inert gas.

The wire 52 and the shielding gas are supplied to the torch 54. The wire 52 protrudes toward the member M at the tip of the torch 54. The torch 54 sprays the supplied shielding gas at the periphery of the wire 52.

The control device 58 controls the components of the welding device 50. Specifically, the control device 58 controls the supply rate of the wire by the wire supply part 51, the flow rate of the shielding gas by the gas supply part 56, the potential of the tip of the wire 52, the potential of the member M, the current flowing through the tip of the wire 52, the waveform of the current, etc. For example, the control device 58 controls the potentials of the member M and the wire 52 so that the wire 52 is positive (+) and the member M is negative (−).

The control device 58 sets the settings to preregistered values. The supply rate of the wire, the flow rate of the shielding gas, the voltage value and current value when welding, the waveform of the current, etc., are preregistered as the settings.

The worker W grips the torch 54 and causes the tip of the wire 52 to approach the member M. An arc is generated by the potential difference between the member M and the wire 52. The worker W welds the object by moving the torch 54 along a prescribed weld line.

Figure 2:
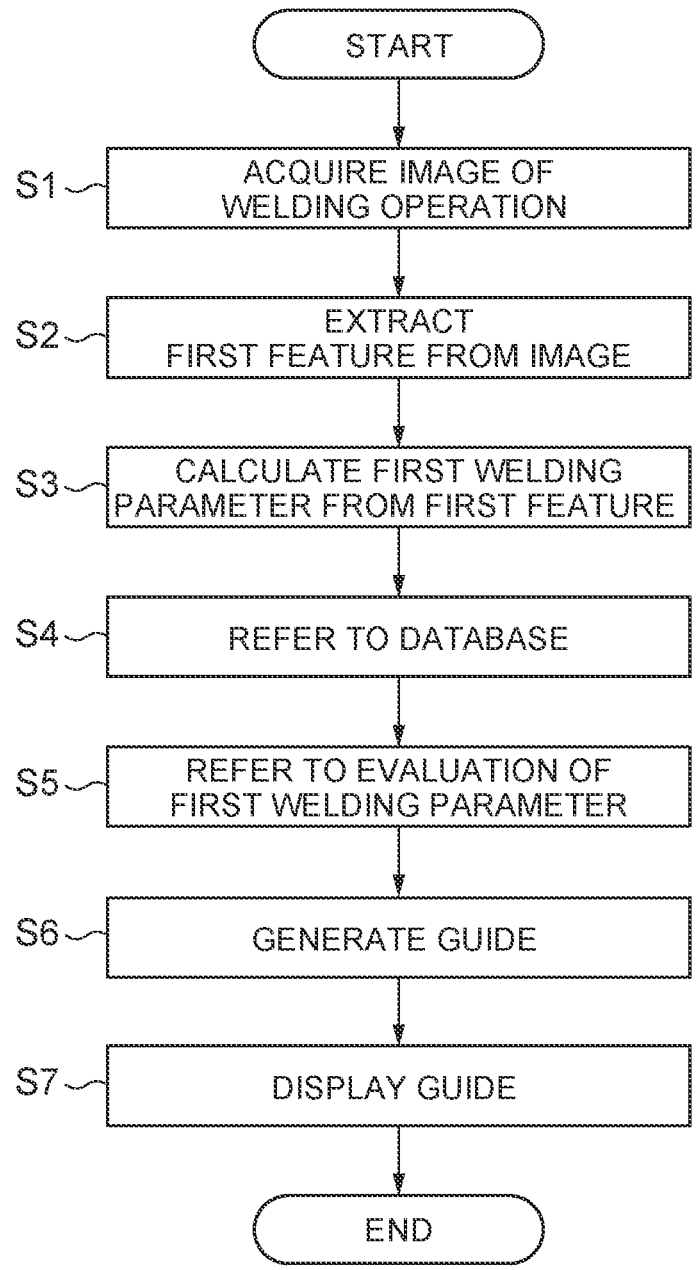
FIG. 2 is a flowchart showing a display control method according to an embodiment.
Figure 3A:
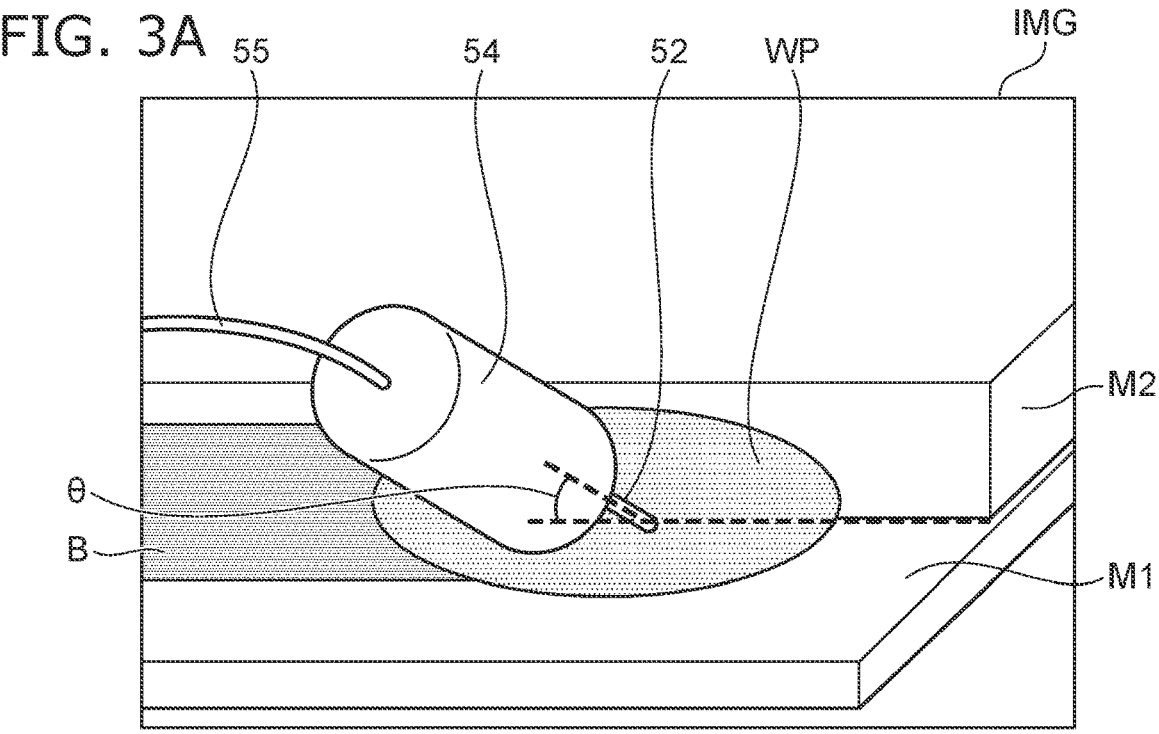
FIGS. 3A and 3B are schematic views showing a specific example of processing by the display control device according to the embodiment.
Figure 3B:
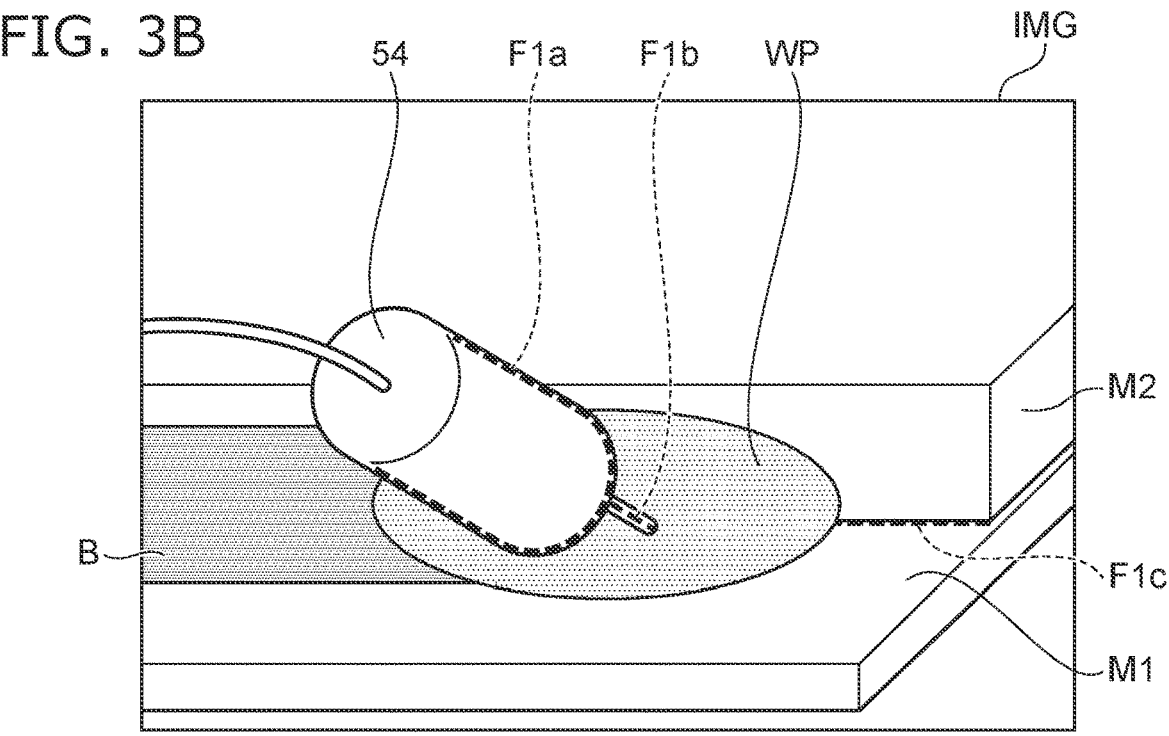
Figure 4A:
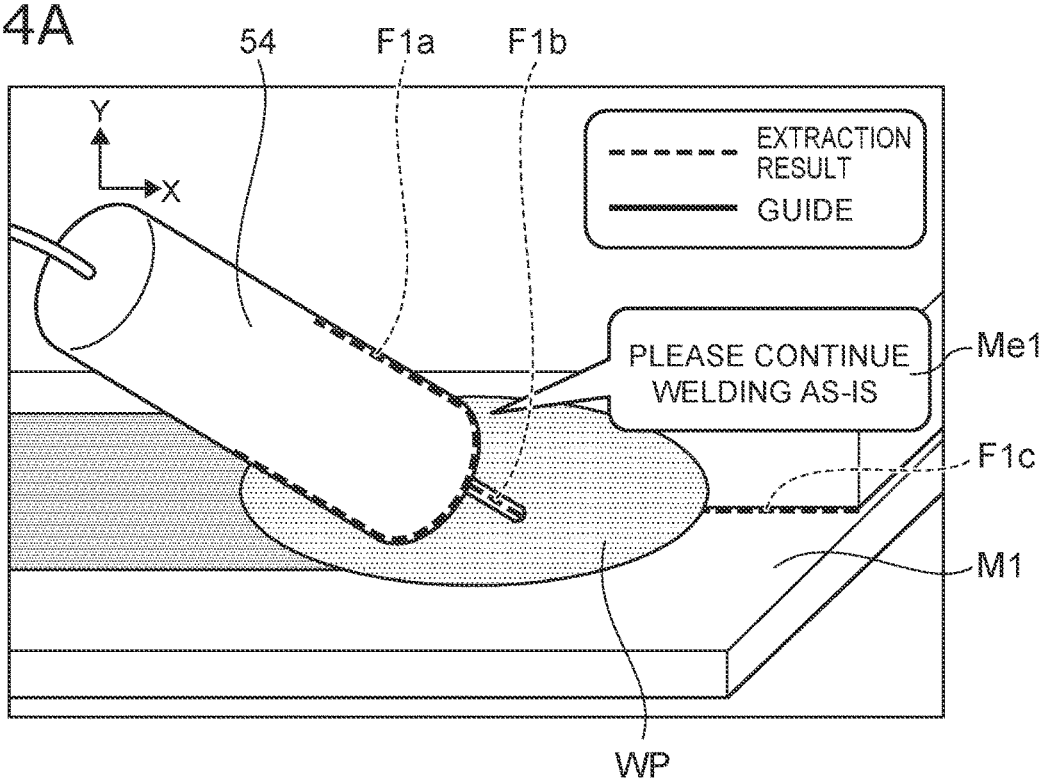
FIGS. 4A and 4B are schematic views showing a display example of the display control device according to the embodiment.
Figure 4B:
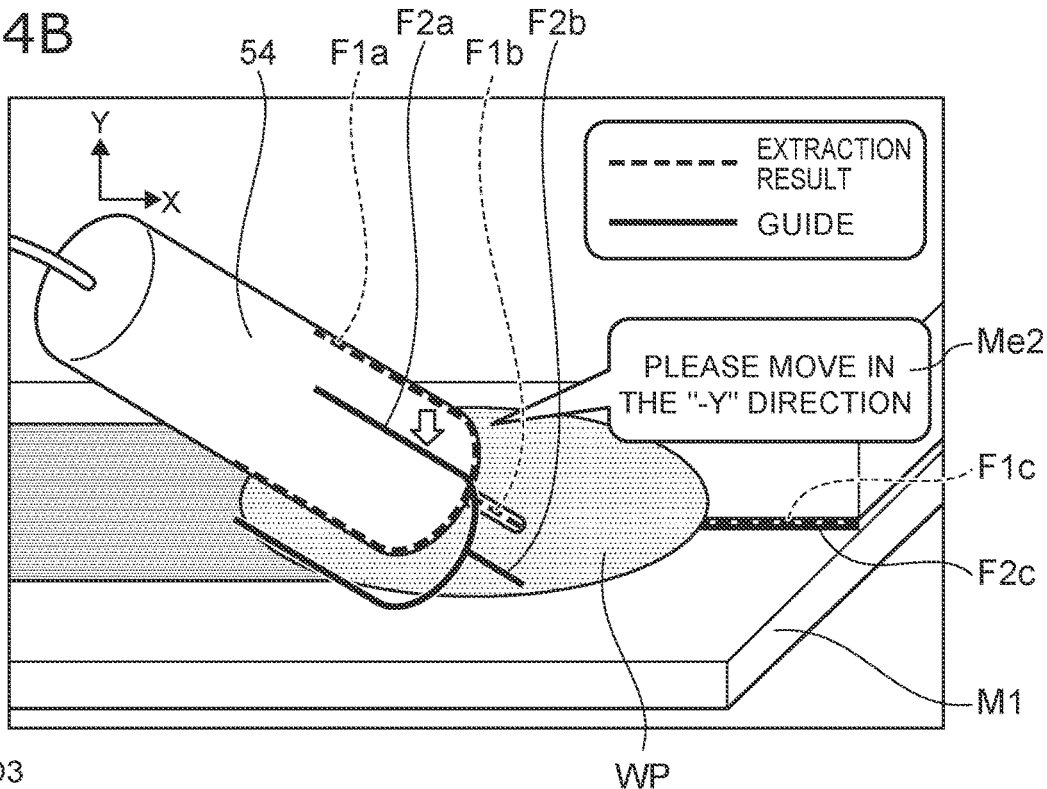

FIG. 2 is a flowchart showing a display control method according to an embodiment. FIGS. 3A and 3B are schematic views showing a specific example of processing by the display control device according to the embodiment. FIGS. 4A and 4B are schematic views showing a display example of the display control device according to the embodiment.

The display control device 10 acquires an image (a first image) of the welding operation imaged by the imaging device 21 (step S1). FIG. 3A is an example of the image. Members M1 and M2 are welded in the image IMG shown in FIG. 3A. The torch 54 moves toward a travel direction D1. At the tip vicinity of the wire 52, the members M1 and M2 and the wire 52 are melted by the arc heat; and a weld pool WP is formed. A bead B is formed at an opposite direction D2 side of the weld pool WP. The opposite direction D2 is the opposite of the travel direction D1.

The display control device 10 extracts a first feature from the image (step S2). The first feature indicates a shape or position of a component related to the welding operation. For example, the display control device 10 extracts the first feature by image processing. Edge detection can be used as the image processing. Preprocessing such as noise reduction, smoothing, edge enhancement, etc., may be performed as appropriate before the edge detection. Or, the display control device 10 may input the image to a trained model. The display control device 10 acquires the first feature output from the model. For example, the model includes a neural network, and is pretrained to output a feature according to the input of an image. Or, image processing and a model may be combined to acquire the first feature. For example, an image that underwent edge detection is input to the model. In such a case, the model is pretrained to output a feature from an image including edges.

As an example, the first feature shown in FIG. 3B is extracted from the image IMG shown in FIG. 3A. The first feature includes features F1a to F1c. The feature F1a indicates the outer edge of the torch 54. A feature F1b indicates the wire 52. The feature F1c indicates the groove between the members M1 and M2. The features F1a to F1c indicate the shapes and positions of the wire 52, the torch 54, and the groove. Also, the outer edge of the weld pool WP, the outer edge of the bead B, etc., may be extracted as features.

The display control device 10 calculates a first welding parameter from the first feature (step S3). The first welding parameter includes the torch angle and the groove position of the welding operation being performed. As shown in FIG. 3A, the torch angle is an angle θ of the torch 54 with respect to the groove (the weld line). The groove is the gap between the members M1 and M2. The groove position is the position of the groove in a vertical direction D3. The vertical direction D3 is perpendicular to the travel direction D1 and the opposite direction D2 and parallel to the stacking direction of the members. Or, the position of the groove in a plane perpendicular to the travel direction D1 and the opposite direction D2 may be calculated as the groove position.

The display control device 10 refers to a database (step S4). The database stores data for generating a guide for the welding operation. For example, the database includes many sets of data stored by repeating welding simulations.

The database stores multiple welding parameters and evaluations for each welding parameter. For example, the welding parameters include the torch angle and the groove position. The evaluations are set according to the possible results for each welding parameter (for each combination of the torch angle and the groove position). A negative evaluation is set for a welding parameter having a high likelihood of obtaining an unfavorable result. An affirmative evaluation is set for a welding parameter having a high likelihood of obtaining a favorable result. Unfavorable results are, for example, the occurrence of a defect, an insufficient joint, etc. Although an example in which two types of evaluations are registered is described herein, three or more types of evaluations may be registered.

The data of the database is generated using a simulation. In the simulation, various welding parameters are set, and welding parameters are evaluated based on the simulation results. In the simulation, a welding phenomena is modeled by combining analysis of the heat source due to the arc and thermal fluid analysis of the weld pool. This model is used to perform numerical analysis of the shape of the heat source due to the arc, the weld pool shape, the state of the weld pool interior, the bead shape, etc. From the perspective of the welding parameter and the accuracy of the evaluation, a simulation that uses thermal fluid analysis is effective. Such a simulation is described in "Development of a Simulation for the TIG Arc Welding Phenomena", Shun Sasoh and Masashi Mouri, IHI Engineering Review, Vol. 57, No. 1 (2017), etc.

Or, the data of the database may be generated using an image when the same welding operation is repeated. For example, multiple workers perform the same welding operation. The imaging device acquires the image of the welding operation. A second feature is extracted from the image. The second feature includes the same type of feature as the first feature. When the outer edge of the torch 54, the wire 52, the groove, etc., are extracted as the first feature as described above, the second feature similarly includes these features. The welding parameter is calculated from the second feature. Also, a user evaluates the welding parameter. The user is a worker, a manager of the display system 1, etc. The welding parameter and evaluation that are obtained are registered in the database. This processing may be performed by the display control device 10 or may be performed by another processing device.

As the welding parameter, the width of the weld pool WP, the movement speed of the torch 54, etc., may be registered in addition to the torch angle and the groove position. The feature that is extracted from the image can be modified as appropriate according to the welding parameter registered in the database. For example, when the welding parameter includes the width of the weld pool WP, a feature that indicates the outer edge of the weld pool is extracted from the image.

The display control device 10 refers to an evaluation for the first welding parameter in the database (step S5). The display control device 10 generates a guide for the worker W based on the first welding parameter and the evaluation for the first welding parameter (step S6). The display control device 10 causes the display device 30 to display the generated guide (step S7).

When the evaluation for the first welding parameter is affirmative, the display control device 10 generates a guide prompting welding as-is. When the evaluation for the first welding parameter is not affirmative, the display control device 10 generates a guide indicating a more appropriate second welding parameter. For example, a welding parameter that is most similar to the first welding parameter and has a higher evaluation than the first welding parameter is extracted from the database as the second welding parameter.

FIG. 4A shows a display example when the evaluation for the first welding parameter is affirmative. FIG. 4B shows a display example when the evaluation for the first welding parameter is not affirmative.

In the example of FIG. 4A, a message Me1 is displayed as the guide to prompt welding as-is. In the example of FIG. 4B, a message Me2 that prompts a correction of the welding parameter and the second feature corresponding to the second welding parameter are displayed as the guide. In FIGS. 4A and 4B, the X-direction of the coordinate system displayed during the guide shows a direction parallel to the travel direction D1 and the opposite direction D2. The Y-direction shows a direction parallel to the vertical direction D3.

The second feature includes features F2a to F2c. The feature F2a indicates the outer edge of the torch 54. The feature F2b indicates the wire 52. The feature F2c indicates the groove. In other words, the second feature includes features corresponding to the first feature. The second feature is displayed using a different form from the first feature. For example, the color, thickness, or line type of the second feature is different from the color, thickness, or line type of the first feature. In the example of FIG. 4B, the first feature is shown by broken lines, and the second feature is shown by solid lines. By using the guide, the worker W can easily ascertain that the torch 54 should be moved so that the torch position is positioned on the second feature.

Advantages of the embodiment will now be described.

The display control device 10 causes the display device 30 to display the first feature extracted from the image and the guide related to the welding operation. Because the first feature is displayed, the worker W can easily ascertain the gist of the current welding operation. By referring to the guide, the worker W can easily ascertain whether or not the welding operation of the worker W is appropriate. Also, because the guide is displayed together with the first feature, the worker W can specifically ascertain how to improve the welding operation of the worker W. Even a worker of limited experience or knowledge can improve the quality of the manual welding operation by referring to the displayed first feature and guide.

As shown in FIG. 4B, the display control device 10 displays the second feature in addition to the first feature extracted from the first image. The second feature corresponds to a more appropriate second welding parameter. Because the second feature is displayed, the worker W can more easily ascertain how to improve the welding operation. The quality of the welding operation can be further improved thereby. The convenience of the display system 1 can be improved.

The display control device 10 may generate history data (log data) related to the welding operation. For example, the display control device 10 records at least one selected from a setting, a welding parameter, and an evaluation at each interval. The welding parameter is calculated from the image of the welding operation. The evaluation is obtained from the database based on the welding parameter.

The display control device 10 outputs the history data after the welding operation has ended. For example, the display control device 10 transmits the history data to an external server by File Transfer Protocol (FTP), etc. The display control device 10 may insert the data into an external database server by using Open Database Connectivity (ODBC), etc., to perform database communication. The display control device 10 may output the history data in a prescribed file format such as Comma Separated Value (CSV), etc., and may write the history data to a recording medium such as flash memory, etc. The display control device 10 may extract the history data only when the evaluation is not affirmative.

There are cases where welding defects are not readily apparent from the exterior. The worker W or the manager also can ascertain the quality of the weld that is not apparent from the exterior by referring to the history data. Or, the history data can be utilized to determine the quality of the joined body that is made. By using the history data, quality that is not apparent from the exterior also can be reflected in the quality of the joined body.

The display control device 10 may automatically determine the quality of the joined body based on the history data. As an example, the three types of evaluations of "good", "acceptable", and "no good" are set for each of the various welding parameters. The quality of the joined body is determined according to the ratio of the time for which a welding parameter having an evaluation of "acceptable" was performed to the time of the entire welding operation. When the ratio is large, the ratio of the time for which a welding parameter having an evaluation of "good" was performed is small. The quality of the joined body is determined to be lower as the ratio increases. Also, when a welding parameter having an evaluation of "no good" is performed even slightly, low quality is determined for the joined body. For example, when an "acceptable" welding parameter is being performed, the display control device 10 displays a guide to perform a "good" welding parameter so that a "no good" welding parameter is not performed.

Although the display device 30 may be a PC monitor, a projector, etc., from the perspective of convenience, it is favorable to use a head mounted display (HMD). The display control device 10 uses mixed reality (MR) technology to display the first feature and the guide overlaid on reality.

Figure 5:
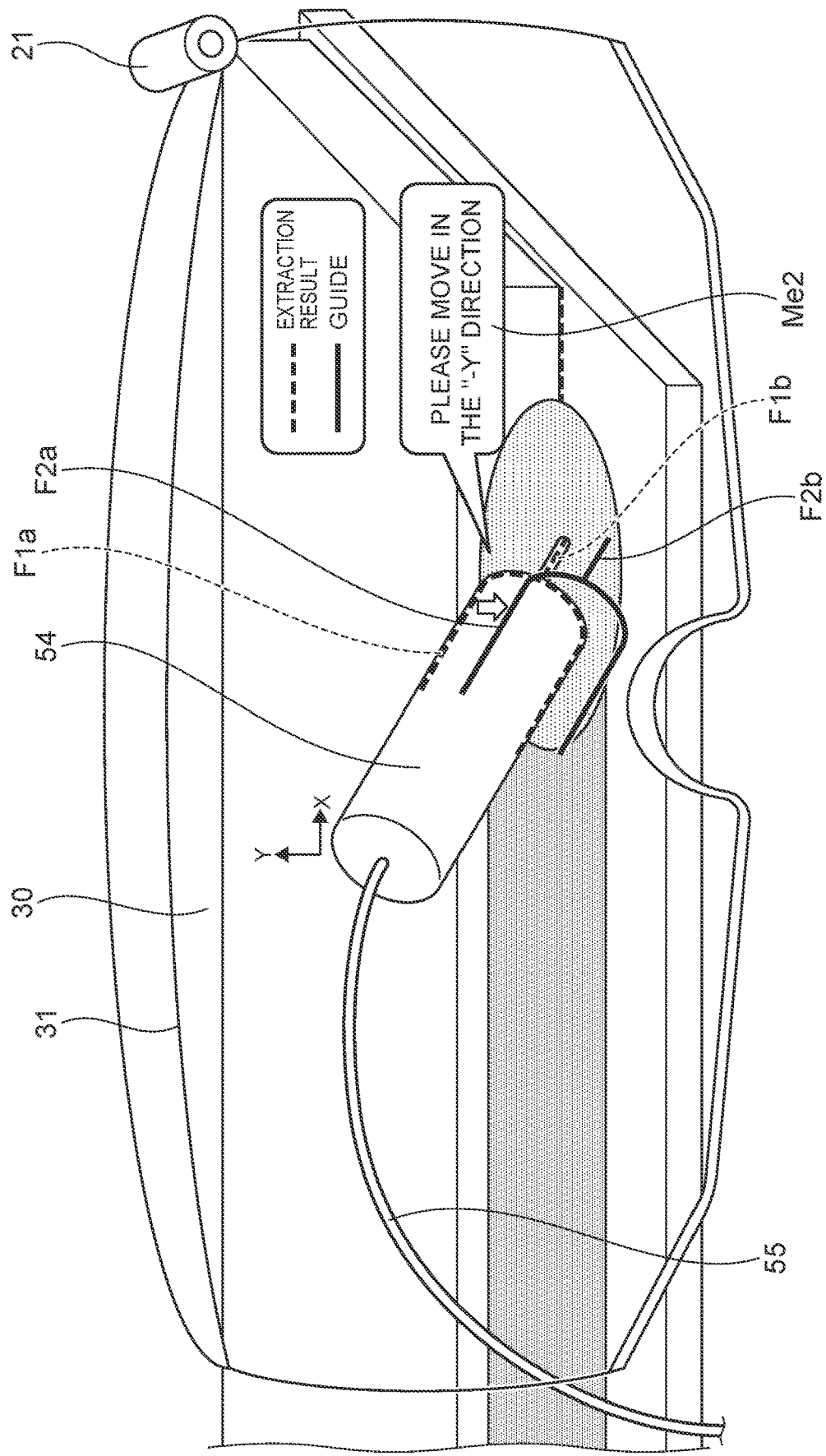
FIG. 5 is a schematic view showing a display example of the display control device according to the embodiment.

FIG. 5 is a schematic view showing a display example of the display control device according to the embodiment.

In the example of FIG. 5, the display device 30 is embedded in a glass 31 of a HMD. The features F1a to F1c (the first feature), the features F1a to F2c (the second feature), the message Me2, etc., are displayed in the glass 31. By using the HMD, the worker W can check the first feature and the guide without moving the line of sight during the welding operation. The convenience of the display system 1 can be improved thereby.

The structure of the glass 31 that includes the display device 30 is arbitrary. As shown in FIG. 5, the glass 31 may be single-lens or twin-lens. The specific structure of the HMD is modifiable as appropriate according to the welding operation. The structure of the HMD is arbitrary, e.g., goggle-type, spectacle-type, front-mounted, etc. As shown in FIG. 1, the HMD may be formed to have a continuous body with the face piece H. Smart glasses may be used as the HMD.

From the perspective of the accuracy, it is favorable to use a model to extract the first feature. The model is pretrained by supervised learning. Multiple sets of training data are used in the training. The training data includes training images and teaching data indicating features of the training images. The model is trained to output the teaching data according to the input of the training image.

FIG. 6A, FIG. 6B, and FIGS. 7A to 7C are images of training data.

Figure 6A:
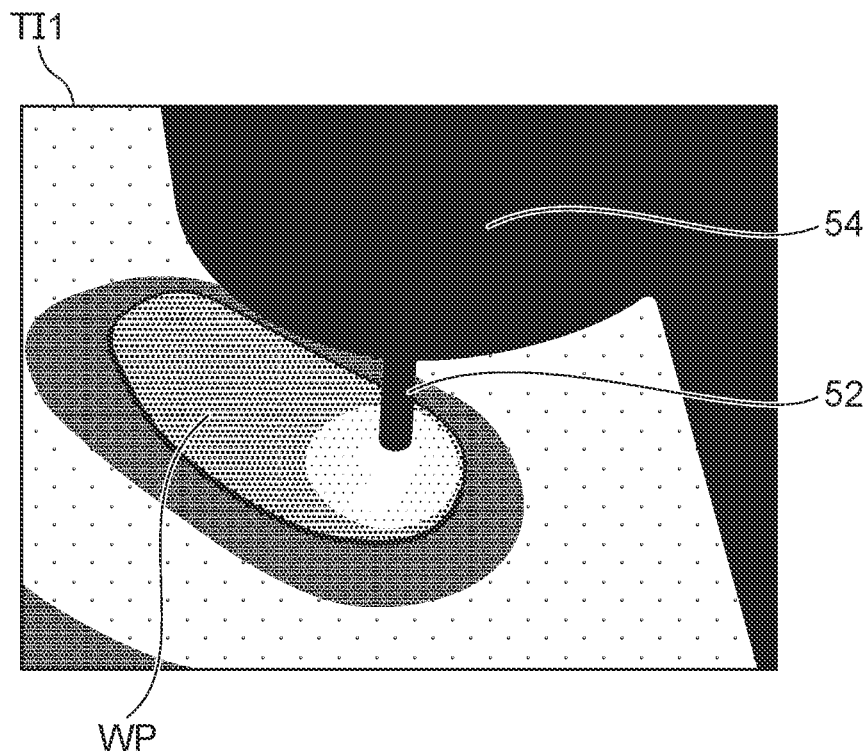
FIG. 6A, FIG. 6B, and FIGS. 7A to 7C are images of training data.
Figure 6B:
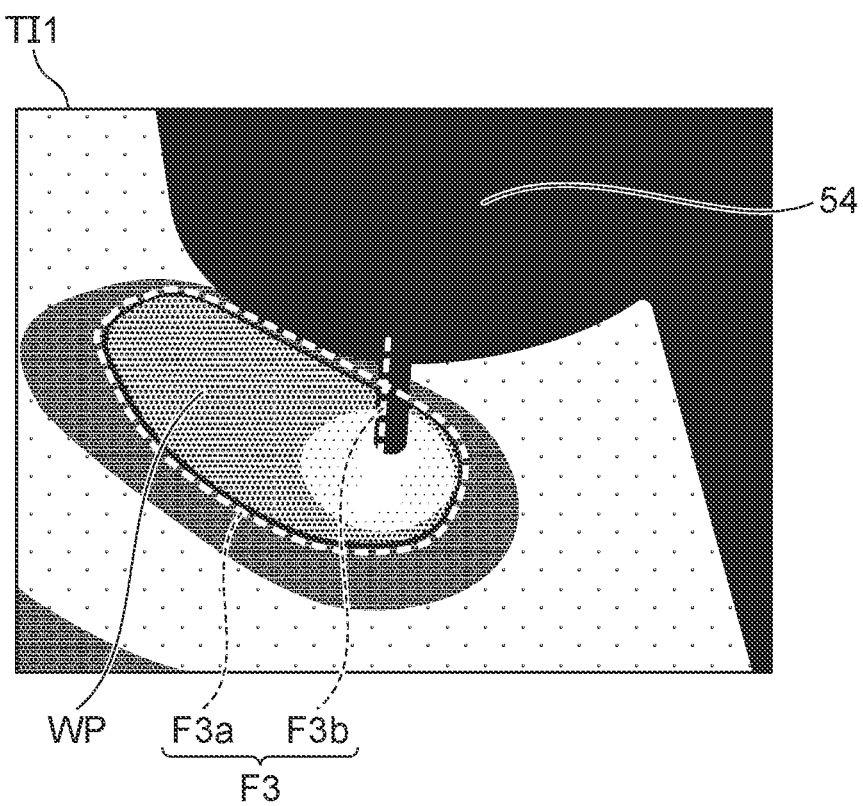

FIG. 6A is a training image TI1 input to the model. FIG. 6B shows a feature F3 of the training image TI1 of FIG. 6A. The feature F3 includes features F3a and F3b. The feature F3a indicates the outer edge of the weld pool WP. The feature F3b indicates the wire 52. The model is trained to output the feature F3 shown in FIG. 6B according to the input of the training image TI1 shown in FIG. 6A. The features that are taught are set according to the features to be output by the model. As shown in FIG. 3B, when features that indicate the outer edge of the torch 54, the groove, etc., are to be output by the model, teaching data that indicates such features is used.

To sufficiently improve the accuracy of the model, it is favorable to prepare many sets of training data. On the other hand, it takes time to prepare the training data. To reduce the time necessary to prepare the training data, a technique in which a training image is processed to generate other training images is effective.

Figure 7A:
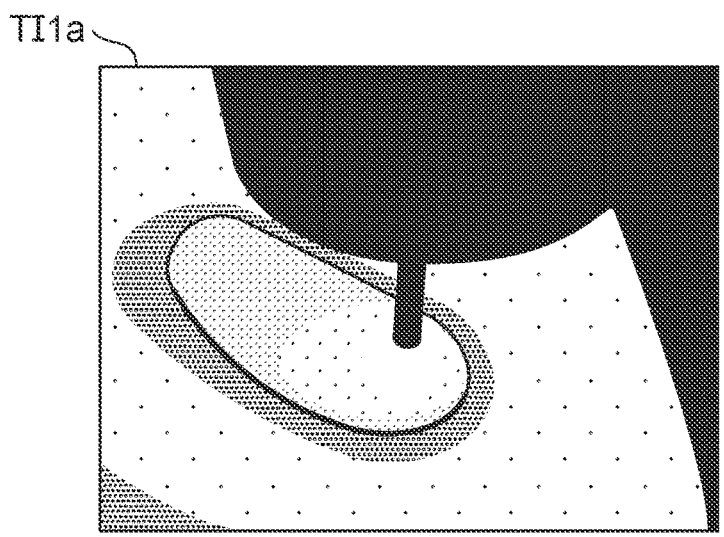
Figure 7B:
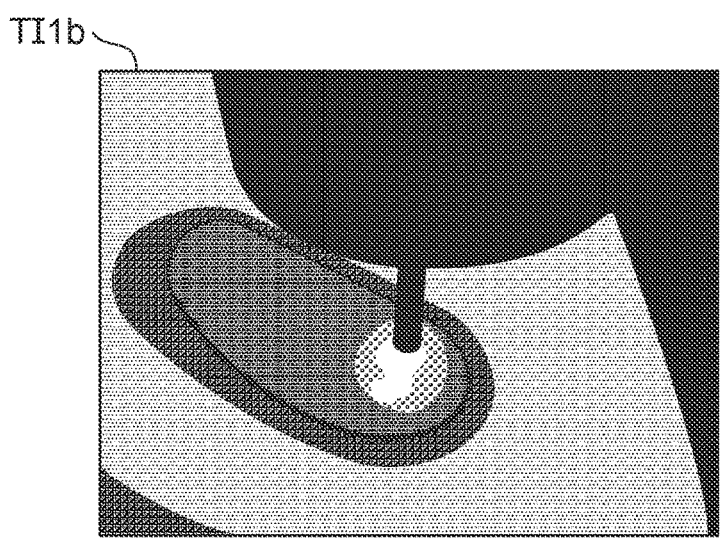
Figure 7C:
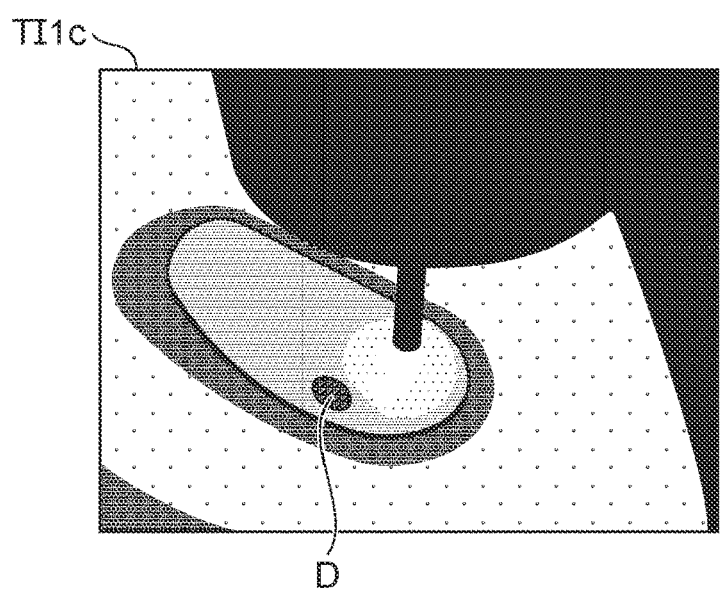

FIGS. 7A to 7C are other training images TI1a to TI1c generated from the training image shown in FIG. 6A. The training image TI1a shown in FIG. 7A is generated by increasing the luminance of the entire training image TI1 shown in FIG. 6A. A training image TI1b shown in FIG. 7B is generated by reducing the luminance of the entire training image TI1. The training image TI1c shown in FIG. 7C is generated by adding a defect D to the training image TI1. The feature F3 of FIG. 6B can be used as the teaching data for the training images TI1a to TI1c of FIGS. 7A to 7C.

By using image processing to generate training images, it is unnecessary to generate training images by imaging actual welding operations. Also, the teaching data can be shared between the original training image and the training images generated by the image processing. Therefore, the training data can be increased while suppressing an increase of the time necessary to prepare the training data.

FIGS. 8A to 8C are images of three-dimensional models of components related to the welding operation. FIG. 8D is an image of a three-dimensional model of the welding operation.

Training data may be generated using a three-dimensional (3D) model. For example, 3D models Mo1 to Mo3 are prepared as shown in FIGS. 8A to 8C. The 3D model Mo1 is of the member M to be welded. The 3D model Mo2 is of the wire 52 and the torch 54. The 3D model Mo3 is of the weld pool WP. For example, the 3D models are generated by computer-aided design (CAD). Or, a model may be generated by scanning an actual object with a 3D scanner, etc. The 3D model Mo4 of the welding operation shown in FIG. 8D is generated using the 3D models of the components shown in FIGS. 8A to 8C.

Optical simulation and physical rendering are performed using the 3D model Mo4 shown in FIG. 8D. In the optical simulation, the behavior of light in the space in which the 3D model is located is reproduced by performing ray tracing from the viewpoint (the imaging device 21) and ray tracing from the lighting 40. The physical values (the illuminance, the luminance, the luminous intensity, or the chromaticity) at each point of the 3D model are obtained by simulation. An image in which the welding operation is reproduced is obtained by rendering the simulation result.

FIG. 9A, FIG. 9B, and FIGS. 10A to 10C are images of training data generated by optical simulation.

Figure 9A:
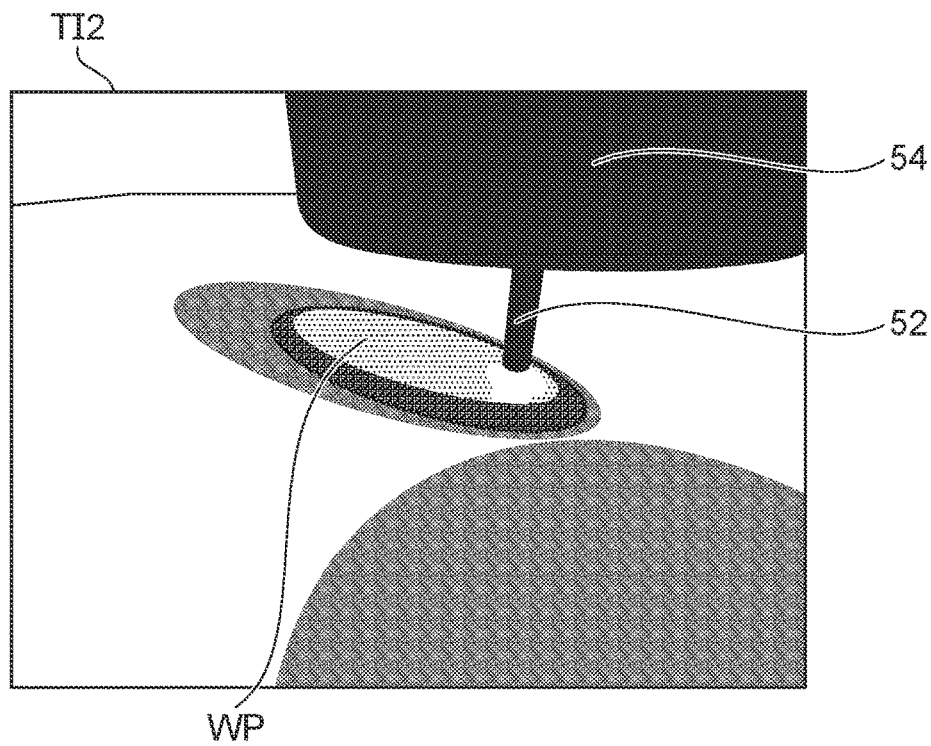
FIG. 9A and FIG. 9B are images of training data generated by optical simulation.
Figure 9B:
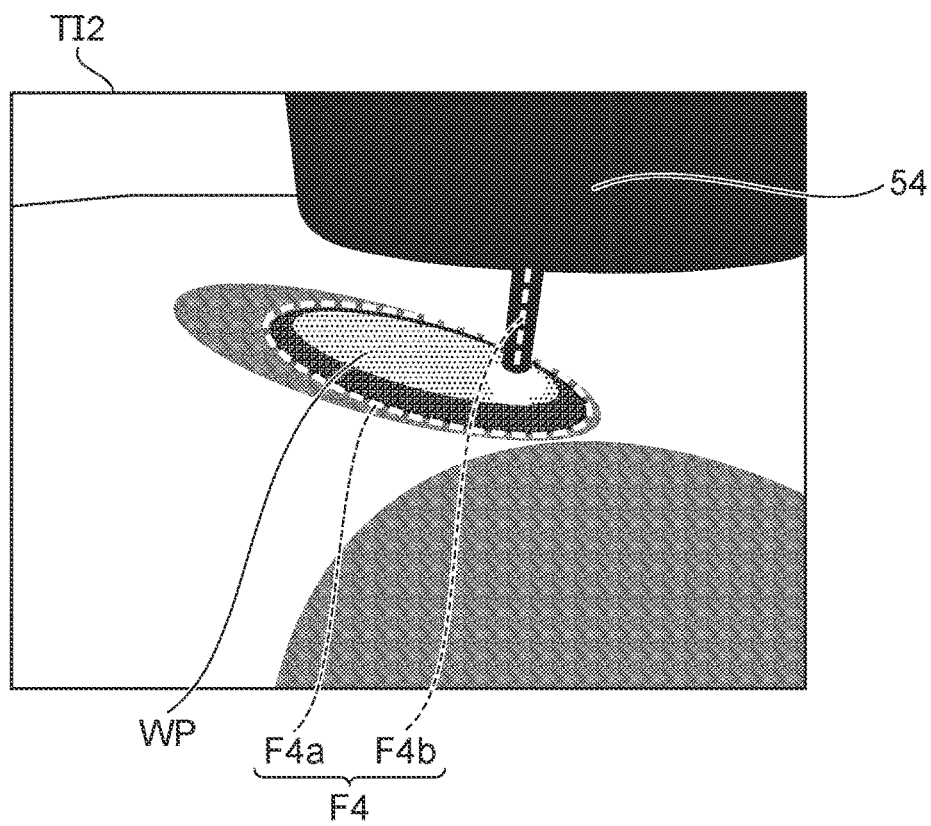

FIG. 9A is a training image TI2 generated using the 3D model Mo4 shown in FIG. 8D. FIG. 9B shows features of the training image of FIG. 9A. A feature F4 includes features F4a and F4b. The feature F4a indicates the outer edge of the weld pool WP. The feature F4b indicates the wire 52. The model is trained to output the feature F4 shown in FIG. 9B according to the input of the training image TI2 shown in FIG. 9A.

Figure 10A:
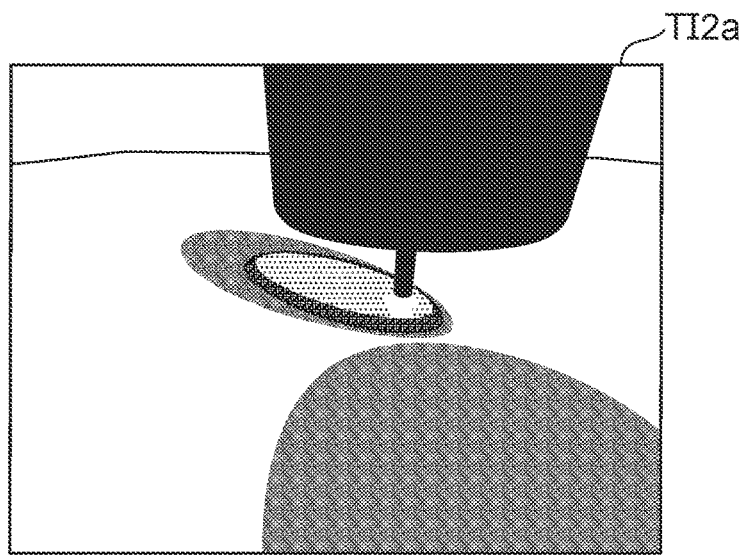
FIGS. 10A to 10C are images of training data generated by optical simulation.
Figure 10B:
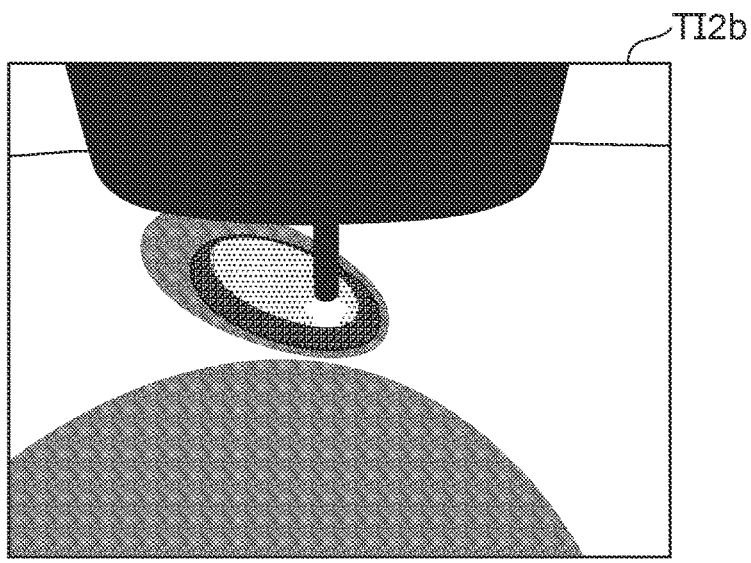
Figure 10C:
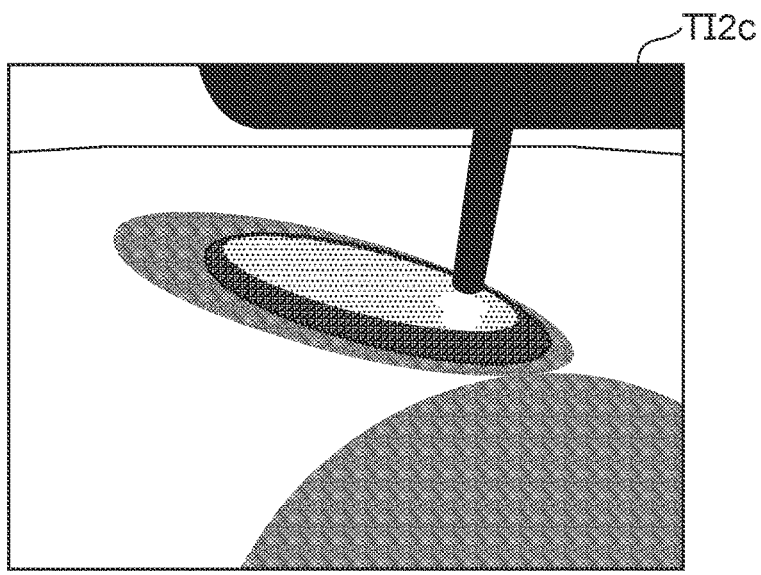

When an optical simulation is used, variation of the training image can be easily generated. For example, different training images can be generated by modifying the distance between the torch 54 and the viewpoint, the orientation of the line of sight to the torch 54, etc. As a specific example, a training image TI2a shown in FIG. 10A is generated by moving the viewpoint away compared to the training image TI2. A training image TI2b shown in FIG. 10B is generated by modifying the angle of the line of sight from the state shown in the training image TI2. A training image TI2c shown in FIG. 10C is generated by moving the viewpoint compared to than the training image TI2.

Features correspond to shapes of components included in the 3D model. Therefore, the features can be generated using the 3D model. For example, the feature F4a shown in FIG. 9B can be generated using the 3D model Mo3 shown in FIG. 8C. The feature F4b can be generated using the 3D model Mo2 shown in FIG. 8B. As one specific example, the colors of the components are set to be different from each other when rendering. Edge detection is performed for the image obtained by rendering. Boundaries between colors are detected as edges. The setting parameters of the edge detection are set according to the colors of the components that contact the boundary to be detected as an edge. According to this method, the time necessary to prepare the training data can be reduced because it is unnecessary for the user to prepare teaching data. Also, image processing such as the addition of defects, etc., is applicable to the image generated by rendering.

The processing described above such as the model training, the training data generation, etc., is performed by a training device. The display control device 10 may be used as the training device, or another processing device may be used as the training device.

Examples in which MAG welding or MIG welding is performed are described above. The invention according to the embodiment also is applicable to other welding operations.

Figure 11:
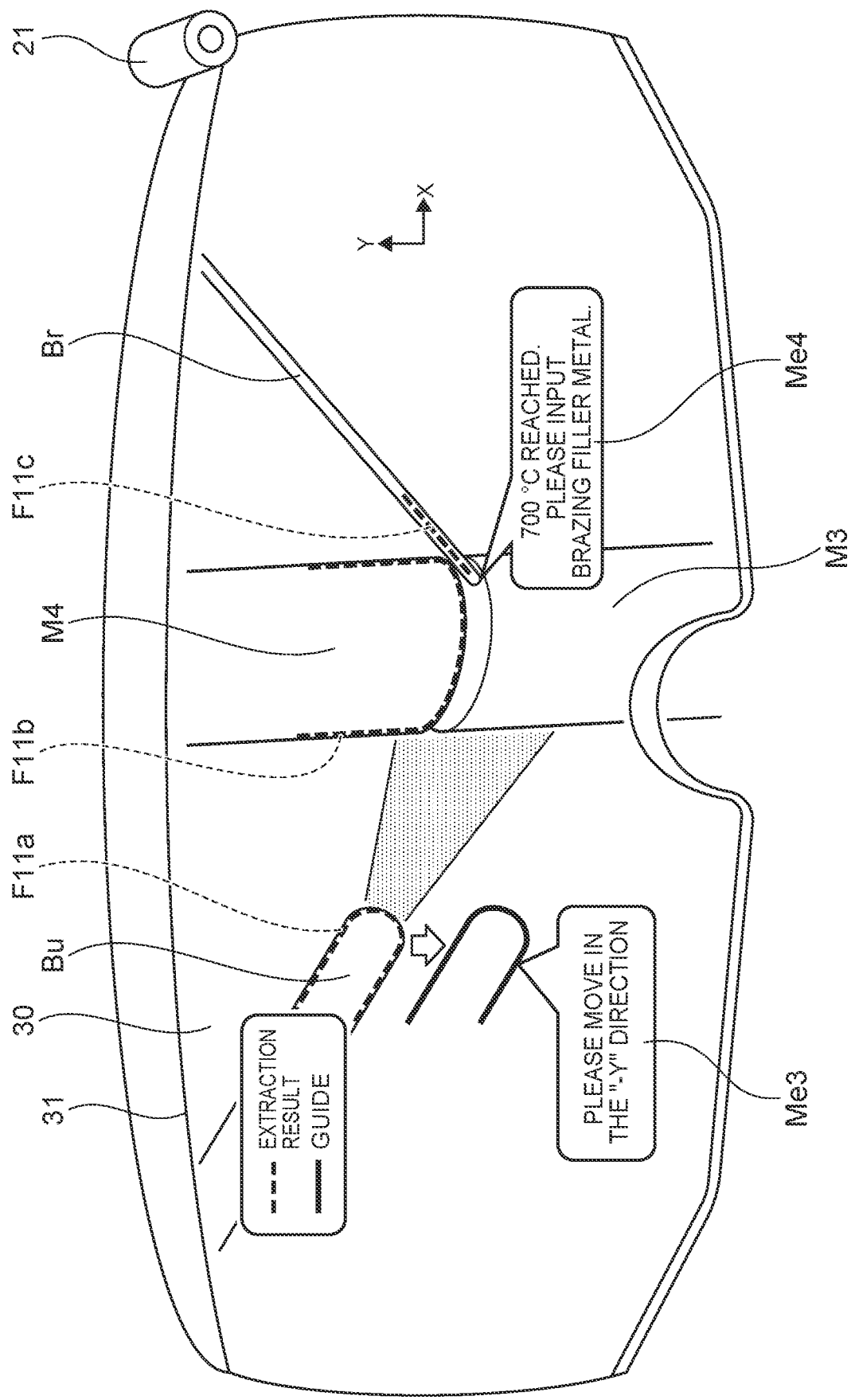
FIG. 11 is a schematic view showing another display example of the display control device according to the embodiment.

FIG. 11 is a schematic view showing another display example of the display control device according to the embodiment.

In the example of FIG. 11, brazing is performed as the welding operation. A brazing material Br is melted by being heated by a burner Bu. Or, the brazing material Br is melted by being heated by contacting a member heated by the burner Bu. Members M3 and M4 are joined by solidifying the molten brazing material Br. The burner Bu is a portion of a welding device.

The imaging device 21 acquires an image by imaging the brazing. The display control device 10 extracts the first feature from the image. The first feature includes features F11a to F11c. The feature F11a indicates the outer edge of the burner Bu. A feature F11b indicates the outer edge of the member M4. The feature F11c indicates the brazing material Br.

The display control device 10 calculates the first welding parameter from the extracted first feature. For example, the first welding parameter includes the angle between the brazing material Br and the burner Bu, the relative position of the burner Bu with respect to the member M4, etc. The display control device 10 refers to the database and displays a message Me3 and the second feature indicating the outer edge of the burner Bu.

As shown in FIG. 11, the guide may include a message Me4 showing an instruction of the welding operation. The instruction is of the procedure of the welding operation. For example, a procedure is displayed at the timing when the temperature of the member M3 or the temperature of the member M4 has reached the appropriate value so that favorable brazing is performed. Damage to the member M3 or the member M4 due to excessive heating can be reduced thereby. The brazing material Br can appropriately flow between the member M3 and the member M4; and favorable brazing can be realized. By displaying the instruction at the appropriate timing, even a worker of limited experience or knowledge can smoothly perform the welding operation. The convenience of the display system 1 can be improved.

Figure 12:
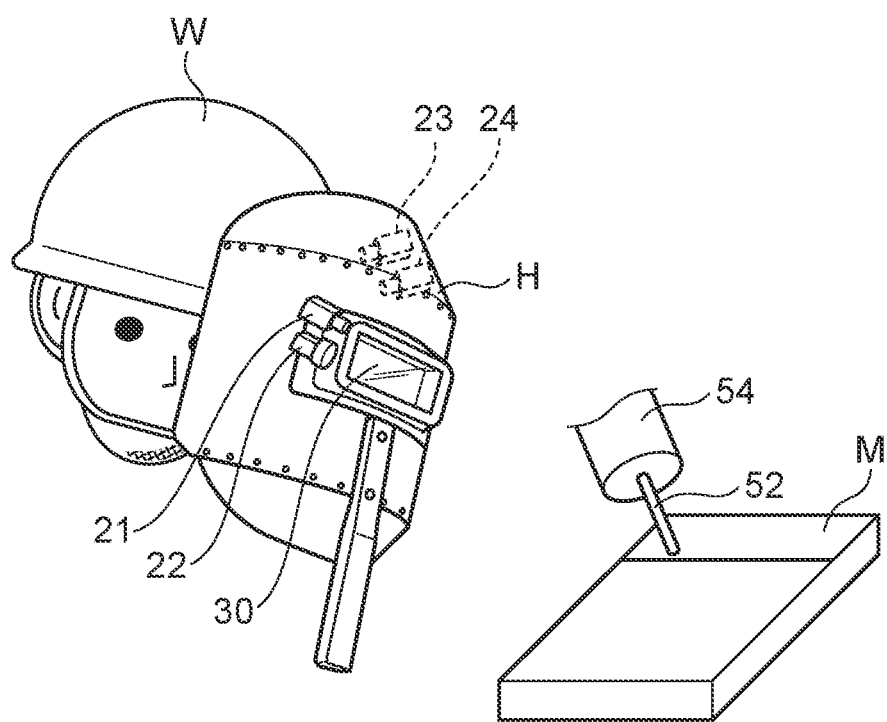
FIG. 12 is a schematic view showing a portion of the configuration of another display system according to the embodiment.

FIG. 12 is a schematic view showing a portion of the configuration of another display system according to the embodiment.

As shown in FIG. 12, the display system 1 may further include an imaging device 22 (a second imaging device), an imaging device 23 (a third imaging device), and an imaging device 24 (a fourth imaging device). For example, the imaging devices 21 to 24 are mounted to the face piece H worn by the worker W.

The imaging device 22 is a depth camera that measures the depth of the imaging subject. Namely, the depth is the distance to the imaging subject. The display control device 10 adjusts the focal point of the imaging device 21 based on the measurement result of the imaging device 22. The depth sensor may be embedded in an image sensor; and one imaging device that has the functions of both the imaging devices 21 and 22 may be used.

The imaging device 23 is a camera that images the eyes of the worker W. The imaging device 24 is a depth camera that measures the depth of the eyes of the worker W. The display control device 10 tracks the line of sight of the worker W based on the data obtained by the imaging devices 23 and 24. The depth sensor may be embedded in an image sensor; and one imaging device that has the functions of both the imaging devices 23 and 24 may be used.

The display control device 10 calculates the eye positions, the orientation of the line of sight, etc., based on the imaging result of the imaging device 23 and the measurement result of the imaging device 24. The display control device 10 calculates the viewpoint of the display device 30 based on these calculation results. In other words, the display control device 10, the imaging device 23, and the imaging device 24 function as an eye tracker. The display control device 10 adjusts the display position of the guide in the display device 30 according to the calculated viewpoint. Thereby, for example, the second feature can be displayed at a more appropriate position. As a result, the quality of the welding operation can be further improved.

Figure 13:
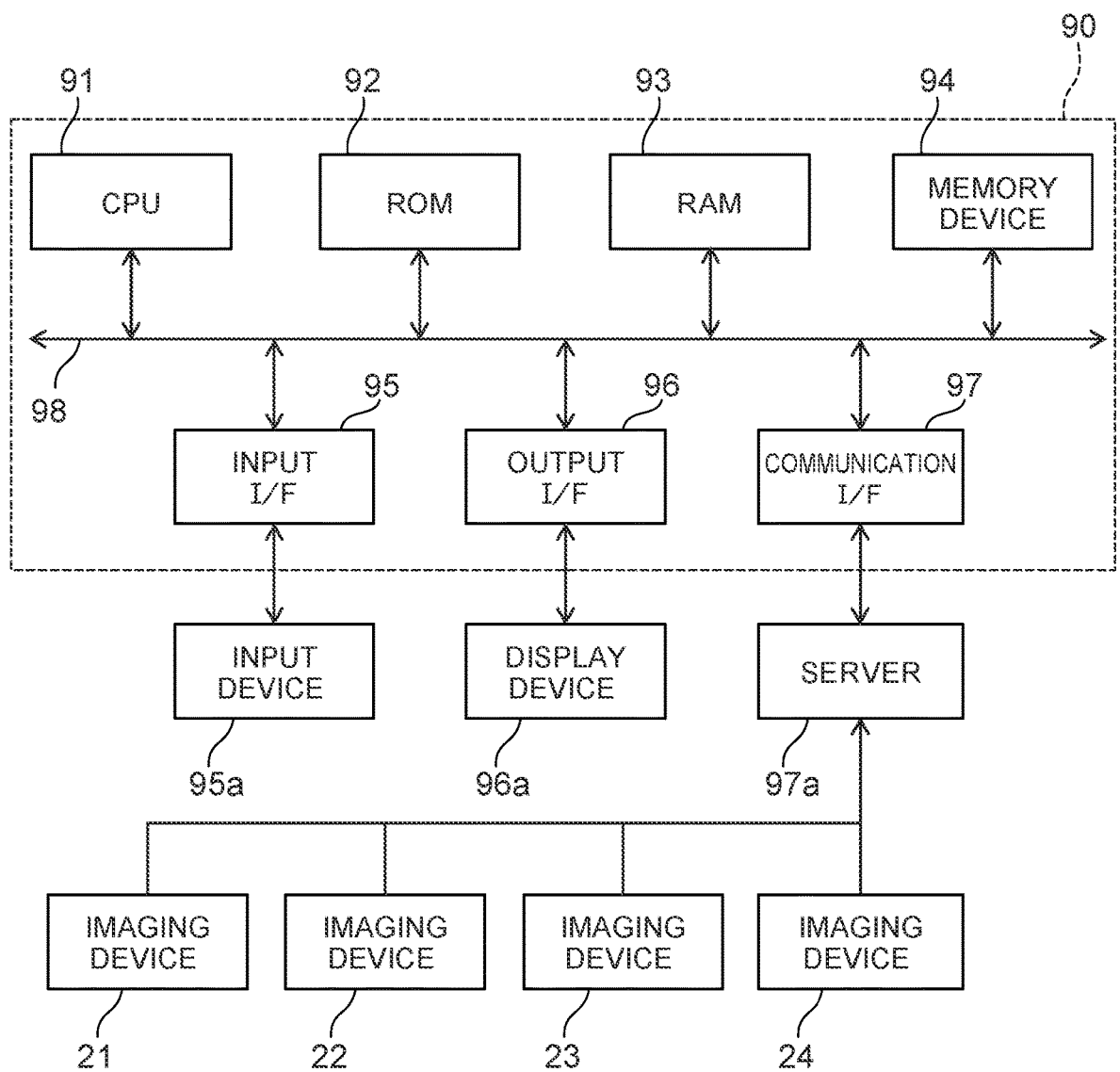
FIG. 13 is a schematic view showing a hardware configuration.

FIG. 13 is a schematic view showing a hardware configuration.

The display control device 10, the control device 58, the training device, the processing device, etc., described above each are realized by a general-purpose or special-purpose computer. The functions of the display control device 10, the control device 58, the training device, and the processing device may be realized by the collaboration of multiple computers or may be realized by one computer. For example, the display control device 10, the control device 58, the training device, and the processing device each include the hardware configuration shown in FIG. 13.

A computer 90 shown in FIG. 13 includes a CPU 91, ROM 92, RAM 93, a memory device 94, an input interface 95, an output interface 96, and a communication interface 97.

The ROM 92 stores programs that control the operations of a computer. Programs that are necessary for causing the computer to realize the processing described above are stored in the ROM 92. The RAM 93 functions as a memory region into which the programs stored in the ROM 92 are loaded.

The CPU 91 includes a processing circuit. The CPU 91 uses the RAM 93 as work memory to execute the programs stored in at least one of the ROM 92 or the memory device 94. When executing the programs, the CPU 91 executes various processing by controlling configurations via a system bus 98.

The memory device 94 stores data necessary for executing the programs and/or data obtained by executing the programs. The memory device 94 functions as a memory device 35.

The input interface (I/F) 95 connects the computer 90 and an input device 95a. The input I/F 95 is, for example, a serial bus interface such as USB, etc. The CPU 91 can read various data from the input device 95a via the input I/F 95.

The output interface (I/F) 96 connects the computer 90 and a display device 96a. The output I/F 96 is, for example, an image output interface such as Digital Visual Interface (DVI), High-Definition Multimedia Interface (HDMI (registered trademark)), etc. The CPU 91 can transmit data to the display device 96a via the output I/F 96 and cause the display device 96a to display an image.

The communication interface (I/F) 97 connects the computer 90 and a server 97a outside the computer 90. The communication I/F 97 is, for example, a network card such as a LAN card, etc. The CPU 91 can read various data from the server 97a via the communication I/F 97. For example, the imaging devices 21 to 24 store the acquired data in the server 97a.

The memory device 94 includes at least one selected from a hard disk drive (HDD) and a solid state drive (SSD). The memory device 94 may be used as the memory device 15. The input device 95a includes at least one selected from a mouse, a keyboard, a microphone (audio input), and a touchpad. The display device 96a includes at least one selected from a monitor and a projector. The display device 96a may be used as the display device 30.

The processing of the various data described above may be recorded, as a program that can be executed by a computer, in a magnetic disk (a flexible disk, a hard disk, etc.), an optical disk (CD-ROM, CD-R, CD-RW, DVD-ROM, DVD±R, DVD±RW, etc.), semiconductor memory, or another non-transitory computer-readable storage medium.

For example, the information that is recorded in the recording medium can be read by the computer (or an embedded system). The recording format (the storage format) of the recording medium is arbitrary. For example, the computer reads the program from the recording medium and causes a CPU to execute the instructions recited in the program based on the program. In the computer, the acquisition (or the reading) of the program may be performed via a network.

According to the embodiments described above, a display control device and a display system are provided in which a guide related to a welding operation can be displayed. The quality of the welding operation can be improved by using the display control device or the display system. Similarly, the quality of the welding operation can be improved by using a welding system that includes the display system and the welding device. Also, the quality of the welding operation can be similarly improved by using a welding method that uses the display control device, a display control method that displays the guide, or a program that causes a computer to execute the display control method.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention. Moreover, above-mentioned embodiments can be combined mutually and can be carried out.

What is claimed is:

1. A display control device,
the display control device being configured to:
acquire a first image of a welding operation,
extract a first feature from the first image, the first feature including at least one selected from the group consisting of a feature indicating an outer edge of a torch used in the welding operation, a feature indicating a wire used in the welding operation, and a feature indicating a groove between welded members,
calculate a first welding parameter from the first feature, the first welding parameter including at least one selected from the group consisting of an angle of the torch with respect to the members, a position of the groove, a width of a weld pool, and a movement speed of the torch,
acquire an evaluation for the first welding parameter,
generate a guide including a second feature based on the first welding parameter and the evaluation, the second feature including the at least one selected from the group consisting of the feature indicating the outer edge of the torch, the feature indicating the wire, and the feature indicating a groove,
cause a display device to display the first feature and the guide.

2. The display control device according to claim 1, wherein the first feature and the second feature each includes the feature indicating an outer edge of the torch, the feature indicating the wire, and the feature indicating the groove.

3. The display control device according to claim 1, wherein:
the display control device generates history data related to the welding operation, and
the history data includes at least one selected from the first welding parameter and the evaluation of the first welding parameter.

4. The display control device according to claim 1, wherein:
the display control device extracts the first feature by using at least one of an image processing or a model, and
the model extracts a feature.

5. The display control device according to claim 4, wherein:
the model is trained using a plurality of training images, and
the plurality of training images is generated by an optical simulation using a three-dimensional model of the welding operation.

6. A display system, comprising:
the display control device according to claim 1;
a first imaging device imaging the first image; and
the display device.

7. The display system according to claim 6, further comprising:
an optical filter, and
the first imaging device generating the first image based on light passing through the optical filter.

8. A welding system, comprising:
the display system according to claim 6; and
a welding device used in the welding operation.

9. A welding method, comprising:
performing at least the welding operation while referring to the guide from the display control device according to claim 1.

10. A display control method, comprising:
causing a processing device to:
acquire a first image of a welding operation, extract a first feature from the first image, the first feature including at least one selected from the group consisting of a feature indicating an outer edge of a torch used in the welding operation, a feature indicating a wire used in the welding operation, and a feature indicating a groove between welded members, calculate a first welding parameter from the first feature, the first welding parameter including at least one selected from the group consisting of an angle of the torch with respect to the members, a position of the groove, a width of a weld pool, and a movement speed of the torch, acquire an evaluation for the first welding parameter, generate a guide including a second feature based on the first welding parameter and the evaluation, the second feature including the at least one selected from the group consisting of the feature indicating the outer edge of the torch, the feature indicating the wire, and the feature indicating a groove, and cause a display device to display the first feature and the guide.

11. A storage medium, the storage medium storing a program, and the program causing the processing device to perform at least the display control method according to claim 10.

12. The display control device according to claim 1, wherein:

the first feature indicates a first position of the outer edge of the torch used in the welding operation, the second feature indicates a second position of the outer edge of the torch, and the second position is more appropriate than the first position for the welding operation.

13. The display control device according to claim 1, wherein:

the first feature indicates a first position of the wire used in the welding operation, the second feature indicates a second position of the wire, and the second position is more appropriate than the first position for the welding operation.

14. The display control device according to claim 1, wherein:

the first feature indicates a first position of the groove in the welding operation, the second feature indicates a second position of the groove, and the second position is more appropriate than the first position for the welding operation.

15. The display control method according to claim 10, wherein the first feature and the second feature each includes the feature indicating an outer edge of the torch, the feature indicating the wire, and the feature indicating the groove.

16. The display control method according to claim 10, wherein:

the first feature indicates a first position of the outer edge of the torch used in the welding operation, the second feature indicates a second position of the outer edge of the torch, and the second position is more appropriate than the first position for the welding operation.

17. The display control method according to claim 10, wherein:

the first feature indicates a first position of the wire used in the welding operation, the second feature indicates a second position of the wire, and the second position is more appropriate than the first position for the welding operation.

18. The display control method according to claim 10, wherein:

the first feature indicates a first position of the groove in the welding operation, the second feature indicates a second position of the groove, and the second position is more appropriate than the first position for the welding operation.

* * * * *